(12) United States Patent
Niemiec et al.

(10) Patent No.: US 9,732,809 B2
(45) Date of Patent: Aug. 15, 2017

(54) ELECTRO-MAGNETIC AND CENTRIFUGAL CLUTCH

(71) Applicant: Ford Global Technologies, LLC, Dearborn, MI (US)

(72) Inventors: Nicholas Niemiec, Livonia, MI (US); Norman Jerry Bird, Plymouth, MI (US); Dennis Neil Wys, Ann Arbor, MI (US); Matthew Stephen Eiszler, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 14/724,191

(22) Filed: May 28, 2015

(65) Prior Publication Data

US 2016/0348741 A1    Dec. 1, 2016

(51) Int. Cl.

| F16D 41/12 | (2006.01) |
|---|---|
| F16D 27/09 | (2006.01) |
| B60K 6/00 | (2006.01) |
| F16D 27/10 | (2006.01) |
| F16D 27/102 | (2006.01) |
| F16D 41/14 | (2006.01) |
| F16D 43/14 | (2006.01) |
| F16D 43/16 | (2006.01) |

(52) U.S. Cl.
CPC .............. *F16D 41/12* (2013.01); *B60K 6/00* (2013.01); *F16D 27/09* (2013.01); *F16D 27/10* (2013.01); *F16D 27/102* (2013.01); *F16D 41/14* (2013.01); *F16D 43/16* (2013.01); *F16D 2043/145* (2013.01)

(58) Field of Classification Search
CPC ........ F16D 41/12; F16D 41/14; F16D 41/125; F16D 27/09; F16D 27/10
See application file for complete search history.

(56) References Cited

U.S. PATENT DOCUMENTS

| 2,863,326 A | 12/1958 | Maurice et al. |
|---|---|---|
| 4,206,837 A | 6/1980 | Brown et al. |
| 5,441,137 A | 8/1995 | Organek et al. |
| 7,743,678 B2 | 6/2010 | Wittkopp et al. |
| 2006/0185957 A1* | 8/2006 | Kimes ................. F16D 41/12 192/46 |
| 2012/0145505 A1* | 6/2012 | Kimes ................. F16D 41/125 192/45.1 |

FOREIGN PATENT DOCUMENTS

| CN | 103615477 A | 3/2014 |
|---|---|---|
| JP | 2006258267 A | 9/2006 |
| WO | 2013091594 A2 | 6/2013 |

* cited by examiner

*Primary Examiner* — Ramya Burgess
*Assistant Examiner* — Lillian Nguyen
(74) *Attorney, Agent, or Firm* — James Dottavio; Brooks Kushman P.C.

(57) ABSTRACT

A clutch includes a first race, a second race, a pawl, a post, and a shoe. The second race defines a cam surface. The pawl is supported in the first race to pivot between an engaged position and a disengaged position such that contact between the cam surface and the pawl in the engaged position prevents relative rotation between the first and second races in at least one direction. The post is supported in the first race to slide between a first and a second position such that in the first position the post forces the pawl into the disengaged position. The shoe is configured to pivot with respect to the first race in response to a magnetic field to slide the post into the second position.

14 Claims, 5 Drawing Sheets

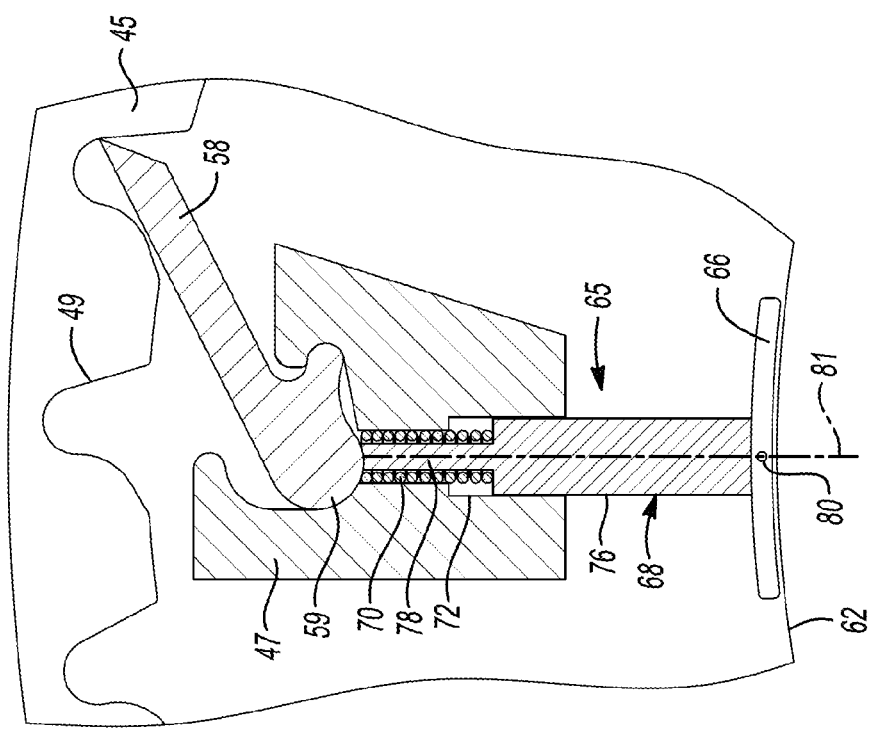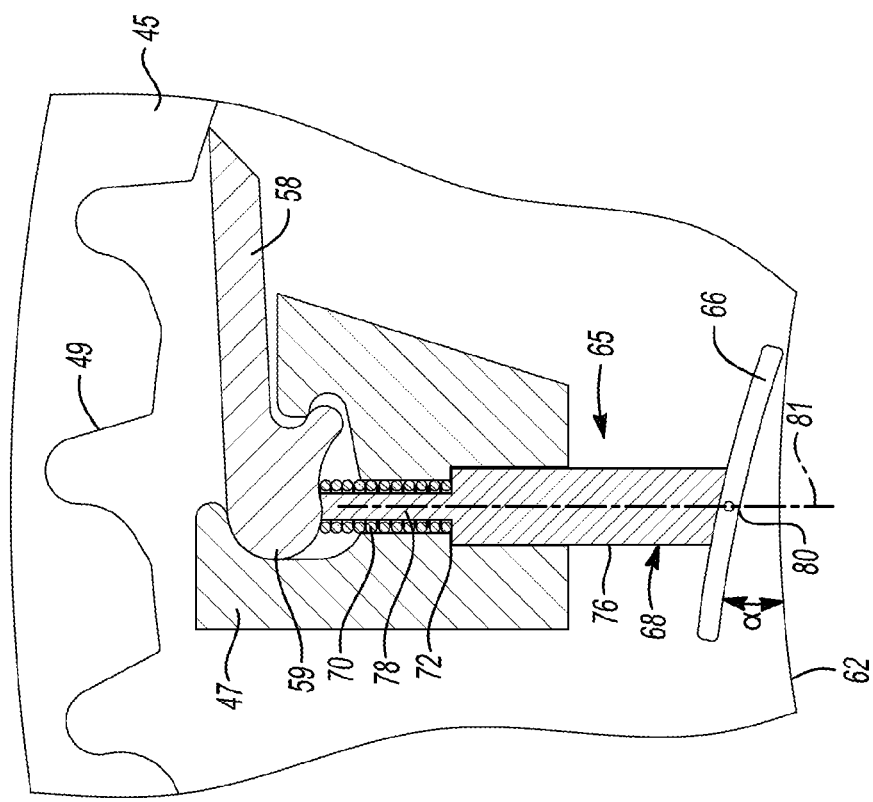

ELECTRO-MAGNETIC AND CENTRIFUGAL CLUTCH

TECHNICAL FIELD

This disclosure relates to the field of vehicle clutches. More particularly, the disclosure pertains to an electro-magnetically actuated pawl clutch used within a hybrid electric powertrain.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions, called discrete ratio transmissions, are configured to establish a finite number of speed ratios between an input shaft and an output shaft. When the currently selected ratio is no longer appropriate, a discrete ratio transmission must shift to a different one of the available speed ratios. Other transmissions, called continuously variable transmissions (CVTs), are capable of establishing any speed ratio between lower and upper limits. CVTs are capable of making frequent fine speed ratio adjustments which are not perceivable by vehicle occupants.

Many transmissions use hydraulically actuated friction clutches to establish various power flow paths. Hydraulic actuation is suited for clutches that selectively couple rotating elements to one another because pressurized hydraulic fluid can be routed from a stationary housing to rotating components between seals. Therefore, the hydraulic actuator can rotate with one of the rotating elements. When there are multiple hydraulically actuated clutches, the clutches often share an engine drive pump and share many of the valve body components used to regulate the pressure.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

SUMMARY

A transmission includes a shaft, an inner race, a gear, an outer race, a non-rotating coil, and a rocker assembly. The shaft is supported for rotation about an axis. The inner race is fixed for rotation with the shaft. The gear is supported for rotation about the axis. The outer race is fixed for rotation with the gear. The outer race also defines a cam surface. The non-rotating coil is configured to establish a magnetic field in the inner race in response to electric current. The rocker assembly includes a pawl, a post, and a shoe.

The pawl is supported in the inner race. The pawl pivots between an engaged position and a disengaged position such that contact between the cam surface and the pawl in the engaged position prevents relative rotation between the inner and outer races in at least one direction. The post is supported in the inner race. The post slides between a first and a second position such that in the first position the post forces the pawl into the disengaged position. The shoe is configured to pivot with respect to the inner race in response to the magnetic field to slide the post into the second position wherein centrifugal force moves the pawl into the engaged position.

A clutch includes a first race, a second race, a pawl, a post, and a shoe. The second race defines a cam surface. The pawl is supported in the first race to pivot between an engaged position and a disengaged position such that contact between the cam surface and the pawl in the engaged position prevents relative rotation between the first and second races in at least one direction. The post is supported in the first race to slide between a first and a second position such that in the first position the post forces the pawl into the disengaged position. The shoe is configured to pivot with respect to the first race in response to a magnetic field to slide the post into the second position.

A clutch includes a pawl, a post, and a shoe. The pawl is supported in a race to pivot between an engaged position and a disengaged position. The post is supported in the race to slide between a first and a second position such that in the first position the post forces the pawl into the disengaged position. The shoe is configured to pivot with respect to the race in response to a magnetic field to slide the post into the second position.

BRIEF DESCRIPTION OF THE DRAWINGS

FIG. 8 is a detailed front view of another embodiment of the rocker assembly; and FIG. 9 is a detailed front view of another embodiment of the rocker assembly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
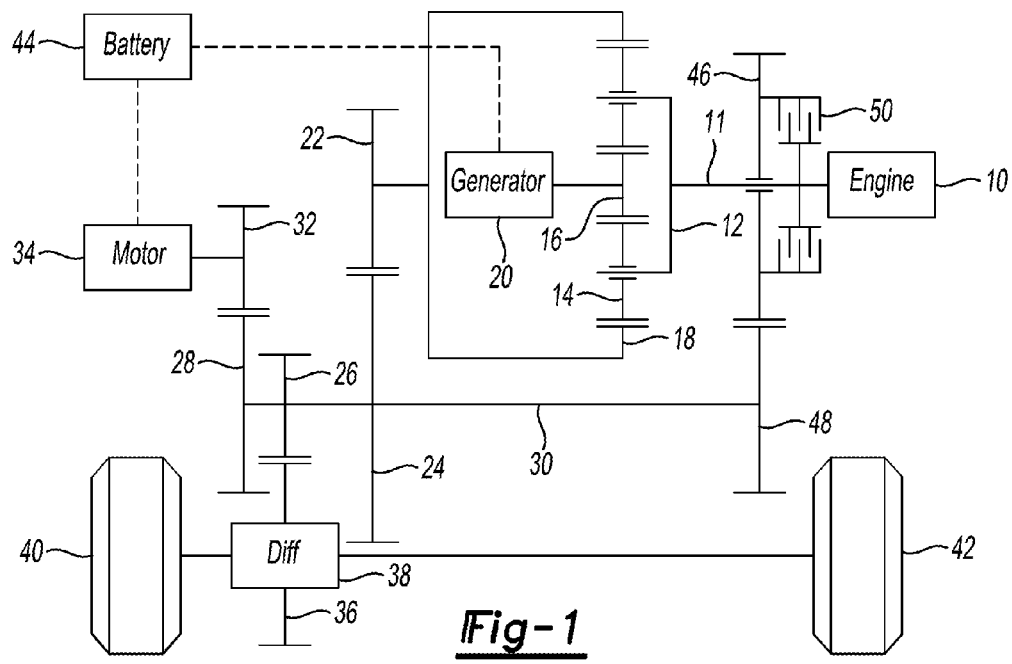
FIG. 1 is a schematic diagram of a gearing arrangement for a hybrid electric powertrain.

FIG. 1 schematically illustrates a kinematic arrangement for a power-split type hybrid electric vehicle. Power is provided by engine 10 which is fixedly coupled to planet carrier 12 via transmission input shaft 11. A set of planet gears 14 are supported for rotation with respect to carrier 12. Sun gear 16 and ring gear 18 are each supported for rotation about the same axis as carrier 12 and each mesh with the planet gears 14. Generator 20 is fixedly coupled to sun gear 16. Layshaft gear 22 is fixedly coupled to ring gear 18 and meshes with layshaft gear 24. Layshaft gear 24 is fixedly coupled to layshaft gears 26 and 28 via shaft 30. Layshaft gear 32 meshes with layshaft gear 28 and is fixedly couple to motor 34. Layshaft gear 26 meshes with layshaft gear 36 which is the input to differential 38. Differential 38 drives wheels 40 and 42 allowing slight speed differences as the vehicle turns a corner.

Generator 20 and motor 34 are both reversible electric machines. The terms generator and motor are used merely as labels. Both machines are capable of converting electrical power to mechanical power or converting mechanical power to electrical power. For example, each machine may be a synchronous motor in combination with a three phase inverter. Both machines are electrically connected to battery 44. In some circumstances, engine 10 may generate more power than is delivered to the vehicle wheels 40 and 42 with the excess power stored in battery 44. In other circumstances, power may flow from battery 44 permitting engine 10 to produce less power than the instantaneous demand of the vehicle. For example, the engine 10 may be off while power to propel the vehicles comes from battery 44.

The powertrain of FIG. 1 can be operated in a continuously variable mode with battery 44 neither providing nor absorbing power. The torque applied to generator 20 and the torque applied to layshaft gear 22 are both related to the torque generated by engine 10 based on the number of teeth on sun gear 16 and the number of teeth on ring gear 18. Specifically, $$T_{gen} = \frac{N_{sun}}{N_{sun} + N_{ring}} T_{eng}$$

-continued $$T_{gear22} = \frac{N_{ring}}{N_{sun} + N_{ring}} T_{eng}$$

where $T_{eng}$ is the torque generated by engine 10, $T_{gen}$ is the torque absorbed by the generator 20, $T_{gear22}$ is the torque absorbed by gear 22, $N_{sun}$ is the number of teeth on sun gear 16, and $N_{ring}$ is the number of teeth on ring gear 18. The engine speed is a weighted average of the generator speed and the speed of gear 22.

$$\omega_{eng} = \frac{N_{sun}}{N_{sun} + N_{ring}} \omega_{gen} + \frac{N_{ring}}{N_{sun} + N_{ring}} \omega_{gear22}$$

When the vehicle is moving slowly, gear 22 rotates slowly and generator 20 rotates in the opposite direction of engine 10. Power generated by the engine is split by the planetary gear set. A portion of the power is transmitted mechanically to shaft 30 from carrier 12 to ring gear 18 to gear 22 to gear 24. The remaining power is transmitted from carrier 12 to generator 20 which converts the power to electrical power. Motor 34 converts the electrical power to mechanical power which is transmitted to shaft 30 by gear 32 and 28. Although both power transfer paths are subject to some parasitic losses, conversions between electrical power and mechanical power typically involve more power loss than purely mechanical transfer. As the ratio of the speed of shaft 30 to the speed of engine 10 increases, a point is reached at which generator 20 is stationary. At this ratio, all of the power is transferred mechanically. At higher overdrive ratios, generator 20 rotates in the same direction as engine 10. Power circulates from generator 20, through the mechanical power flow path to shaft 30, through gears 28 and 32 to motor 34 which converts the power into electrical power to drive generator 20. The parasitic losses associated with the circulation of power tend to make operation at overdrive ratios inefficient.

The powertrain of FIG. 1 includes an additional power flow path to provide efficient power transfer at overdrive speed ratios. Specifically, layshaft gear 46 is supported for rotation about transmission input shaft 11. Layshaft gear 48 is fixedly coupled to shaft 30 and meshes with layshaft gear 46. Clutch 50 selectively couples layshaft gear 46 to shaft 11. When clutch 50 is engaged, power is transferred mechanically from engine 10 to shaft 30 via gears 46 and 48. In this fixed ratio mode of operation, battery 44 can provide additional power via either generator 20 or motor 34 or can be charged via either electrical machine. Use of the fixed ratio mode for steady state cruising significantly reduces fuel consumption because both the engine and the transmission operate efficiently.

Figure 2:
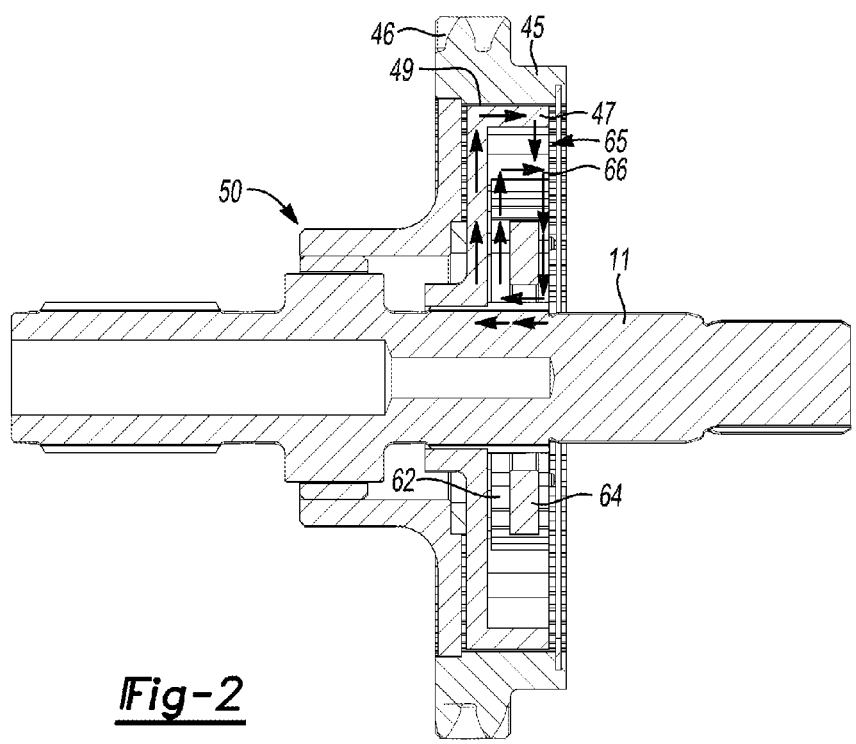
FIG. 2 is a cross section of an electro-magnetically actuated pawl clutch suitable for use in the gearing arrangement of FIG. 1.
Figure 3:
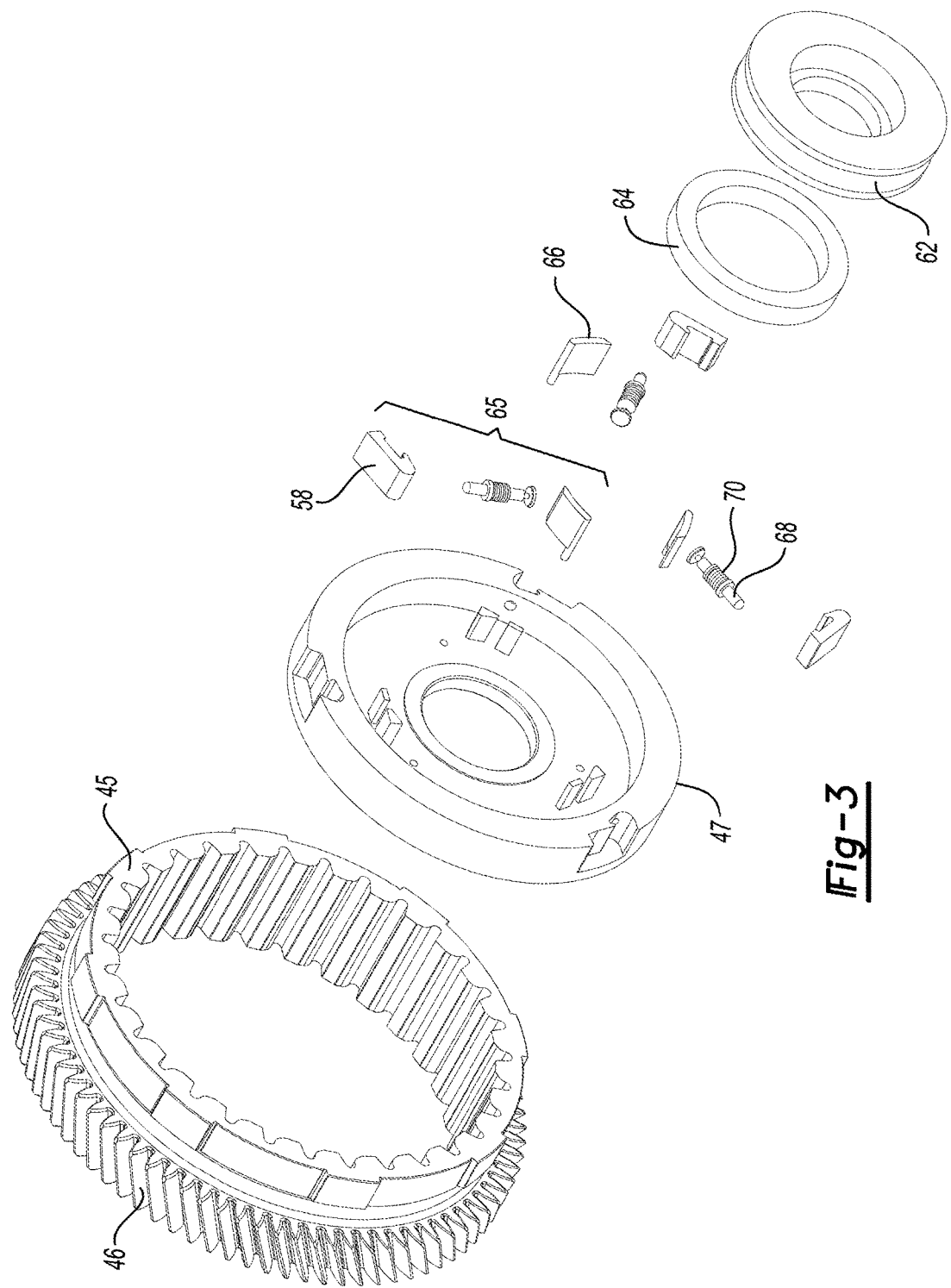
FIG. 3 is an exploded view of the clutch.
Figure 4:
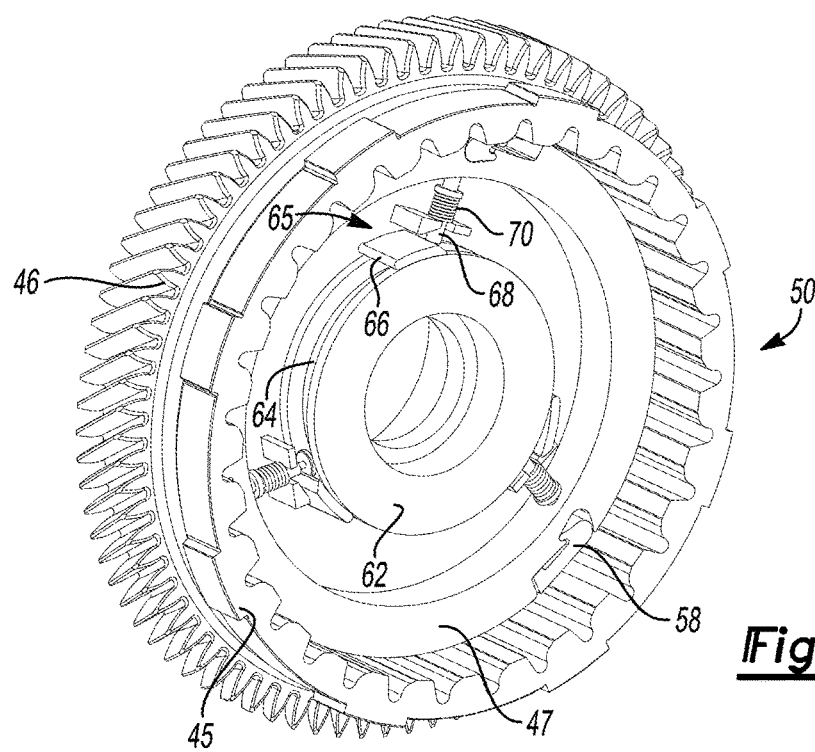
FIG. 4 is an isometric view of the clutch.

Since clutch 50 is the only clutch in the powertrain of FIG. 1, use of a hydraulically actuated clutch would require addition of a pump and valve body. Therefore, a different method of actuating clutch 50 is desired. FIGS. 2 through 4 illustrate an electro-magnetically actuated rocker clutch suitable for selectively coupling gear 46 to shaft 11. FIG. 2 shows a cross sectional view of clutch 50. FIG. 3 shows an exploded pictorial view and FIG. 4 shows an assembled pictorial view. An outer race 45 is formed integrally with gear 46 although in some embodiments it could be formed separately and joined by a spline or other means. In at least one embodiment, the inner race 47 of the clutch 50 may be a one piece inner race 47, however an inner race 47 having two inner halves may also be used. During installation into the transmission, thrust and radial bearings (not shown) are inserted between the inner race 47 and the outer race 45 to reduce friction and to ensure concentricity. Three pawls 58 are held within pockets, or grooves of the inner race 47, as shown in FIG. 4. The number of pawls may vary among embodiments. As discussed in more detail below, when clutch 50 is disengaged, these pawls 58 are contained within pockets formed into the inner race 47. When clutch 50 is engaged, these pawls pivot and engage a cam surface 49 in the outer race 45. The inner race 47 is held in position axially by a snap ring (not shown).

After assembly of clutch 50, the inner race 47 is splined to the input shaft 11. A coil support 62 and coil 64 are mounted to a front support (not shown) of the transmission. A wire connects the coil to a transmission controller (not shown). Then, the input shaft 11 and clutch 50 are inserted into front support. A ball bearing (not shown) locates the input shaft 11 with respect to the front support and permits rotation of the input shaft 11 with very low parasitic drag. When electrical current is supplied to coil 64, a magnetic circuit is established as indicated by the arrows. By selecting appropriate materials and controlling part location, magnetic flux is directed from the coil support 62 through the input shaft 11, the inner race 47, and directly into a shoe 66 of a rocker assembly 65, and then back to coil support 62. Secondary fringe fields may also direct the magnetic flux from the coil support 62 through the input shaft 11, the outer race 45, and the shoe 66 of the rocker assembly 65, and then back to the coil support 62. The shoe 66 and rocker assembly 65 will be discussed in more detail below.

The primary flux path has one air gap between the shoes 66 and the coil support 62. The secondary flux passes through multiple air gaps: a gap between coil support 62 and input shaft 11 and a gap between the inner race 47 and the shoes 66. The air gaps act to pull shoes 66 in the same direction. Using multiple air gaps to pull shoes 66 in the same direction allow use of the secondary fringe fields in addition to the primary flux path to make the flux path more efficient. Magnetic attraction forces are created between the corresponding parts at each of these air gaps. Other part geometry could be envisioned which would establish a magnetic field in the inner race in response to electrical current in a non-rotating coil, including other arrangement with different air gaps.

Figure 5:
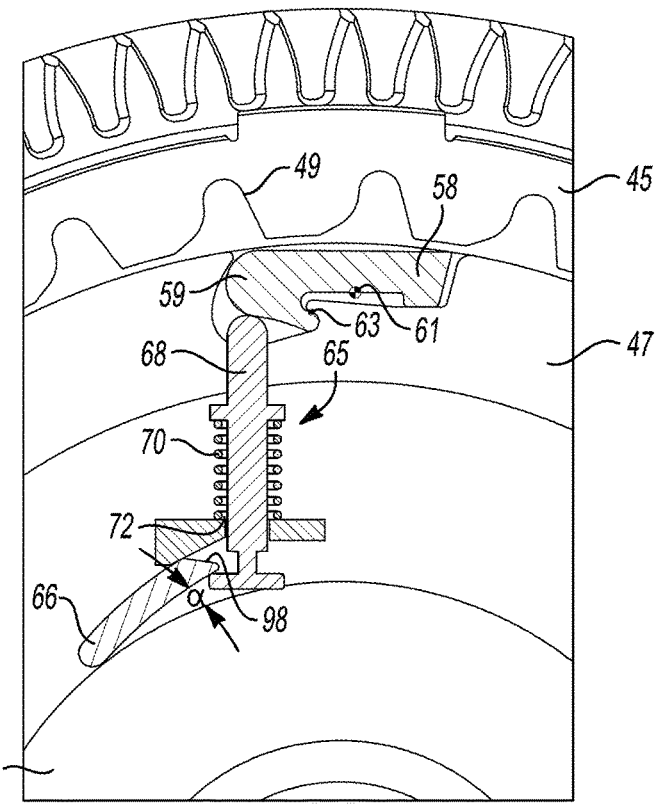
FIG. 5 is a detailed cross-sectional view of the clutch in a disengaged state.
Figure 6:
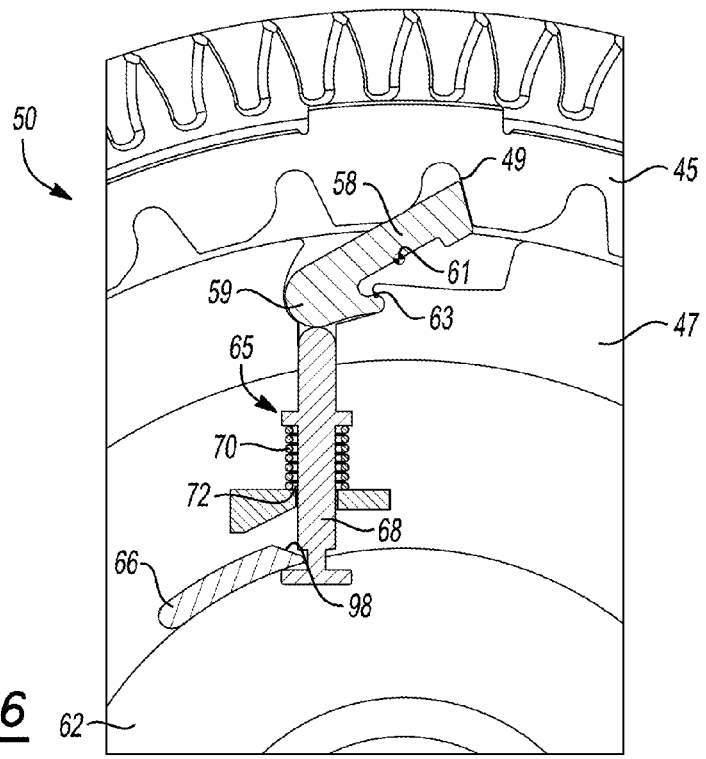
FIG. 6 is a detailed cross-sectional view of the clutch in an engaged state.

FIGS. 5 and 6 show a detailed cross-sectional view of clutch 50 perpendicular to the cross sectional view of FIG. 2. FIGS. 5 and 6 depict the pawls 58 as part of the rocker assembly 65. The rocker assembly 65 also includes the shoe 66, a post 68, and a biasing member 70. The shoe 66 attaches to the post 68 and is configured to engage the coil support 62 when electrical current is supplied to the coil 64. The magnetic flux acts on the shoe 66 attracting the shoe 66 to the coil support 62. When the magnetic circuit is established, the rocker assembly 65 moves vertically toward the coil support 62 and clutch 50 engages. When electrical current is not supplied to coil 64, the centrifugal forces act on the rocker assembly 65 and clutch 50 disengages. FIG. 5 shows a detailed cross-sectional view of the rocker assembly 65 when clutch 50 is disengaged. FIG. 6 shows a detailed cross-sectional view of the rocker assembly 65 when clutch 50 is engaged. In this embodiment, the shoe 66 is supported by the post 68 using a latch-type arrangement.

As detailed in FIG. 5, the shoe 66 is disengaged from the coil support 62 and pawl 58 is contained within the pocket of the inner race 47. As stated above, when pawl 58 is contained within the pocket of the inner race 47, clutch 50 disengages. Without an electrical current, the coil 64 does not generate magnetic flux. The post 68 is configured to slide vertically from a first position to a second position. The first position of the post 68 is detailed in FIG. 5 and the second position of the post is detailed in FIG. 6. In the absence of the magnetic flux, the centrifugal forces acting on the rocker assembly 65 allow the post 68 to engage pawl 58. The post 68 slides vertically to the first position within a channel 72 formed on the inner race 47 to push pawl 58 away from the cam surface 49 of the outer race 45. The force of the post 68 on pawl 58 overcomes the centrifugal force acting on a center of gravity 61 of the pawl 58 and forces pawl 58 to maintain a tucked, or disengaged position. As shown in FIG. 5, when pawl 58 is in the tucked position, the inner race 47 spins freely relative to the outer race 45 and clutch 50 is disengaged.

The rocker assembly 65 may further use the biasing member 70 to aid the post 68 in forcing pawl 58 to maintain the tucked position. In the absence of centrifugal forces, pawl 58 may inadvertently engage the cam surface 49 of the outer race 45. The biasing member 70 biases pawl 58 providing a spring force on pawl 58 when the centrifugal forces are absent. The spring force of the biasing member 70 allows pawl 58 to maintain the tucked position and avoid inadvertent engagement of clutch 50. The biasing member 70 is configured to overcome gravity and any other unintentional forces, which may cause pawl 58 to engage the cam surface 49 of the outer race 45.

FIG. 5 depicts the shoe 66 as defining a beveled end 98. The beveled end 98 of the shoe 66 allows the shoe 66 to be supported for rotation on the post 68. When the pawl 58 is disengaged from the outer race 45 and tucked within the inner race 47, the shoe 66 is displaced angularly with respect to the coil support 62 on the post 68. For example, the biasing member 70, as well as the centrifugal force, forces the post 68 to engage the pawl 58 at the first end 59. As stated above, engagement between the post 68 and the pawl 58 force the pawl 58 to be tucked into the inner race 47 and clutch 50 is disengaged. Therefore, the post 68 moves laterally within channel 72 and is linearly offset with respect to the coil support 62. Having the beveled end 98 of the shoe 66 supported for rotation on the post 68 causes angular displacement of the shoe 66 at an angle a when clutch 50 is disengaged with respect to the coil support 62. Angle a may be optimized to ensure an efficient engagement between the shoe 66 and the coil support 62 based on the magnetic flux generated through coil 64.

The shoe may define an arcuate shape. Specifically, the shoe 66 is concentric with the coil support 62 and is configured to engage the coil support 62 through interaction with magnetic flux. Introduction of magnetic flux forces the shoe 66 to displace angularly at the beveled end 98 with respect to the coil support 62 such that the shoe 66 engages the coil support 62. Angular displacement of the shoe 66 at the beveled end 98 forces the post 68 to displace linearly within channel 72 toward coil support 62. The angular displacement of the beveled end 98 of the shoe 66, and likewise the linear displacement of the post 68, allows the pawl 58 to rotate and extend out of the inner race 47 and engage the outer race 45 due to the centrifugal forces of the inner race 47. When pawl 58 engages the outer race 45, the inner race 47 rotates at the same rate of the outer race 45 and clutch 50 is engaged.

As detailed in FIG. 6, the shoe 66 engages the coil support 62 allowing the pawl 58 to pivot about a pivot point 63. The magnetic flux creates the magnetic attractive force between the shoe 66 and the coil support 62 that overcomes the centrifugal force of the post 68. Offsetting the centrifugal force with the magnetic attractive force causes the post 68 to slide vertically into the second position and allows the pawl 58 to pop out from a tucked position to an engaged position within the inner race 47. The post 68 is configured to engage the pawl 58 and upon establishing the magnetic circuit, the post 68 disengages from the pawl 58. When the post 68 slides into the second position, the centrifugal forces acting on the center of gravity 61 of the pawl 58 cause the pawl 58 to pivot about pivot point 63. Pivoting about pivot point 63 allows the pawl 58 to engage the cam surface 49 of the outer race 45. Engagement between the pawl 58 and the cam surface 49 of the outer race 45 causes simultaneous rotations of the outer race 45 and the inner race 47.

The concentricity between the shoe 66 and the coil support 62 ensures a uniform interaction with the magnetic flux when the rocker assembly 65 is engaged. Uniform interaction with the magnetic flux ensures that the attractive force generated by the established magnetic circuit between the shoe 66 and the coil support 62 is strong enough to maintain engagement between the shoe 66 and the coil support 62. This allows pawl 58 to maintain engagement with the cam surface 49 of the outer race 45 using the centrifugal force of the rotating inner race 47.

Figure 7:
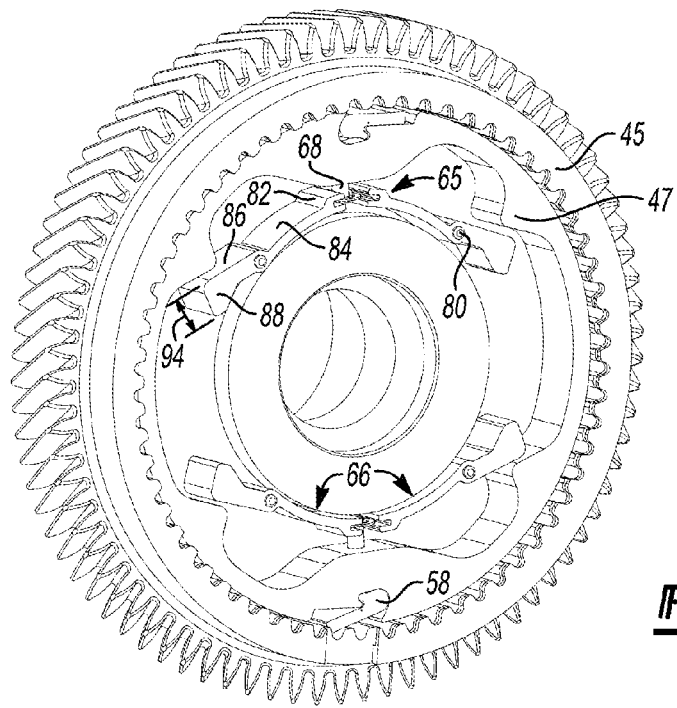
FIG. 7 is an isometric view of another embodiment of the clutch.

FIG. 7 shows an assembled pictorial view of a further embodiment of clutch 50 before installation into the transmission. FIG. 7 depicts a two pawl 58 embodiment of clutch 50. The rocker assembly 65 depicted in FIG. 7 uses a plurality of shoes 66 to engage and disengage clutch 50. The shoes 66 depicted in FIG. 7 are attached to the post 68 at a first end 82 of a first portion 84. The first end 82 may be mechanically fastened to the post 68. For example the first end 82 of the first portion 84 of the shoes 66 may be welded, adhered, bonded, or attached to the post by design. The first portion 84 defines an arcuate section concentric with coil support 62. The shoes 66 pivot about a pin 80. The pin 80 is defined on and attached to the inner race 47 and may be configured to support the shoes 66 for rotation on the inner race 47. The pin 80 may be attached to the inner race 47 through the shoes 66 between the first portion 84 and a second portion 86 of the shoes 66.

Again referring to the two pawl 58 embodiment of FIG. 7, the second portion 86 includes a second end 88. The second end 88 defines a thickness 94 greater than the first end 82 of the first portion 84. Because the second end 88 of the shoes 66 is thicker than the first end 82, the second portion 86 may increase the attractive force acting on the shoes 66. Specifically, the magnetic flux density is primarily focused on the first end 82 of the first portion 84 of the shoes 66. However, a thicker second end 88 of the second portion 86 may increase the flux interacting with the shoes 66. By increasing the magnetic flux interacting with the shoes 66, a quicker response time of the rocker assembly 65 and a stronger engagement between the shoes 66 and the coil support 62 is achieved. This allows for a more efficient engagement of the clutch 50.

FIGS. 8 and 9 shows a detailed front view of another embodiment of the rocker assembly 65. FIG. 8 depicts a detailed front view the rocker assembly 65 when pawl 58 is disengaged from the outer race 45. As stated above, when pawl 58 is disengaged from the outer race 45, it is tucked within the inner race 47. FIG. 9 depicts a detailed front view the rocker assembly 65 when pawl 58 is engaged with the outer race 45. As stated above, when pawl 58 is engaged with the outer race 45, clutch 50 is engaged and the inner race 47 rotates at the same rate of the outer race 45.

The post 68 is shown as having a first portion 76 and the second portion 78. The first portion 76 is depicted is thicker than the second portion 78. In at least one other embodiment, the post 68 may have a uniform thickness. Further, the post 68 is depicted as having a rectangular cross-section. In at least one other embodiment, the post 68 may embody other cross-sectional areas, such as but not limited to, cylindrical, square, or any other cross-sectional area which allows the post 68 to move within channel 72 and act on the pawl 58. The biasing member 70 is depicted on the second portion 78 of the post 68. The biasing member 70 may also be configured to expand and collapse within channel 72. In at least one embodiment, the biasing member 70 may be a spring.

As depicted in the embodiment of FIGS. 8 and 9, the shoe 66 attaches, via a pin 80, to the post 68. The pin 80 may attach the shoe 66 to the post 68 at substantially a center 81 of the post 68. Locating the pin 80 centrally on the post 68 allows the shoe 66 to be pivotable about the pin 80. In at least one other embodiment, the shoe 66 may attach to the post 68 offset from the center 81 of the post 68. Creating a pivot between the shoe 66 and the post 68 about the pin 80 reduces the air gap between the shoe 66 and the coil support 62. The position of the pin 80 on the post 68 as well as on the shoe 66 may further allow for optimization of the response of the shoe 66 to the magnetic flux. For example, an angle a may define the air gap between the shoe 66 and the coil support 62. Angle a may be optimized, based on the position of the pin 80 either on the post 68, on the shoe 66, or on both the post 68 and the shoe 66, to increase the response of the rocker assembly 65 when engaging clutch 50.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   a shaft supported for rotation about an axis;
   an inner race fixed for rotation with the shaft;
   a gear supported for rotation about the axis;
   an outer race fixed for rotation with the gear, the outer race defining a cam surface;
   a non-rotating coil configured to establish a magnetic field in the inner race in response to electric current; and
   a rocker assembly including
      a pawl supported in the inner race to pivot between an engaged position and a disengaged position such that contact between the cam surface and the pawl in the engaged position prevents relative rotation between the inner and outer races in at least one direction,
      a post supported in the inner race to slide between a first and a second position such that in the first position the post forces the pawl into the disengaged position, and
      a shoe supported by the post and configured to pivot about a pin within the inner race, and with respect to the inner race in response to the magnetic field to slide the post into the second position wherein centrifugal force moves the pawl into the engaged position.

2. The transmission of claim 1, wherein the rocker assembly further includes a biasing member disposed at a first end of the post.

3. The transmission of claim 1, wherein the shoe has a first end and a second end wherein the second end has a thickness greater than the first end, the second end being configured to interact with the magnetic field.

4. A clutch comprising:
   a first race;
   a second race defining a cam surface;
   a pawl supported in the first race to pivot between an engaged position and a disengaged position such that contact between the cam surface and the pawl in the engaged position prevents relative rotation between the first and second races in at least one direction;
   a post supported in the first race to slide between a first and a second position such that in the first position the post forces the pawl into the disengaged position; and
   a shoe supported in the first race by a pin and being configured to pivot with respect to the first race in response to a magnetic field to slide the post into the second position.

5. The clutch of claim 4, wherein the engaged position of the pawl prevents relative rotation of the first and second races in exactly one direction.

6. The clutch of claim 4 further comprising a non-rotating coil configured to establish a magnetic field in the first race in response to electric current.

7. The clutch of claim 4, wherein the first race is disposed radially inside the second race.

8. The clutch of claim 4, wherein the pawl has a center of gravity located such that centrifugal force causes the pawl to pivot about a pivot point into the engaged position when the post is in the second position.

9. A clutch comprising:
   a pawl supported in a race to pivot between engaged and disengaged positions;
   a post supported in the race such that in a first position the post forces the pawl into the disengaged position;
   a shoe configured to pivot with respect to the race in response to a magnetic field to slide the post into a second position; and
   a pin arranged to connect the shoe to the post.

10. The clutch of claim 9, wherein the shoe is configured to pivot about the pin in response to the magnetic field.

11. The clutch of claim 9, wherein the pin is attached at substantially a center of the shoe to substantially a center of the post.

12. The clutch of claim 9, wherein the pin is attached offset from a center of the shoe and centrally on the post.

13. The clutch of claim 9, wherein the pin is attached offset from a center of the post and centrally on the shoe.

14. The clutch of claim 9, wherein the pin is attached offset from a center of the shoe and offset from a center of the post.

* * * * *